United States Patent [19]
Oishi

[11] Patent Number: 5,224,771
[45] Date of Patent: Jul. 6, 1993

[54] HEAD LAMP DEVICE FOR AUTOMOBILES

[76] Inventor: Satoshi Oishi, 1213-2, Hatsuoi-cho, Hamamatsu-shi, Shizuoka-ken 433, Japan

[21] Appl. No.: 830,695

[22] Filed: Feb. 4, 1992

[30] Foreign Application Priority Data

Feb. 8, 1991 [JP] Japan .................. 3-104012

[51] Int. Cl.$^5$ .......................... B60Q 1/04; F21V 9/12
[52] U.S. Cl. ......................................... 362/61; 362/80; 362/318; 359/228; 359/886
[58] Field of Search ............... 362/279, 293, 318, 321, 362/61, 80, 320, 352; 359/228, 886

[56] References Cited

U.S. PATENT DOCUMENTS

| 1,199,534 | 9/1916 | Ernst | 362/318 |
| 4,704,667 | 11/1987 | Ploeger | 362/318 |
| 4,726,656 | 2/1988 | Schofield et al. | 359/665 |

Primary Examiner—Ira S. Lazarus
Assistant Examiner—L. Heyman
Attorney, Agent, or Firm—Darby & Darby

[57] ABSTRACT

A head lamp device for automobiles has a light source and a cover member arranged in front of the light source. The light source is comprised of a transparent hard resin plate curved outwardly at its central part, and a transparent soft resin sheet intimately in contact with a rear surface of the transparent hard resin plate with a peripheral edge of the transparent soft resin sheet attached fluid tight to a peripheral edge of the transparent hard resin plate. The transparent hard resin plate has a pipe through which a colored solution is supplied into and removed from a space formed between the transparent hard resin plate and the transparent soft resin sheet.

4 Claims, 2 Drawing Sheets

Fig. 4
Fig. 5
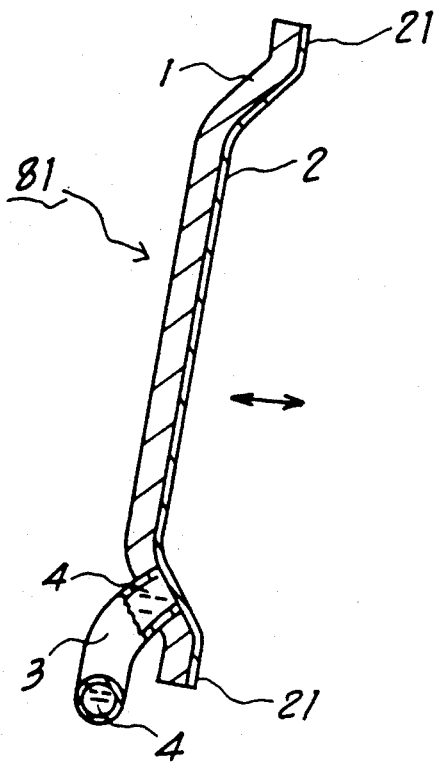
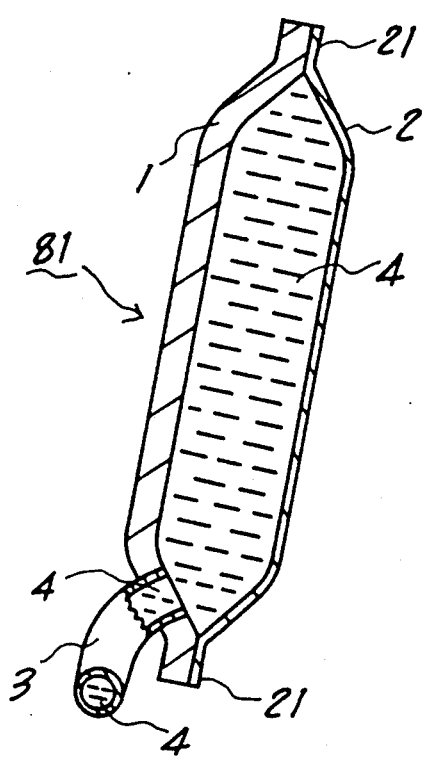
Fig. 6
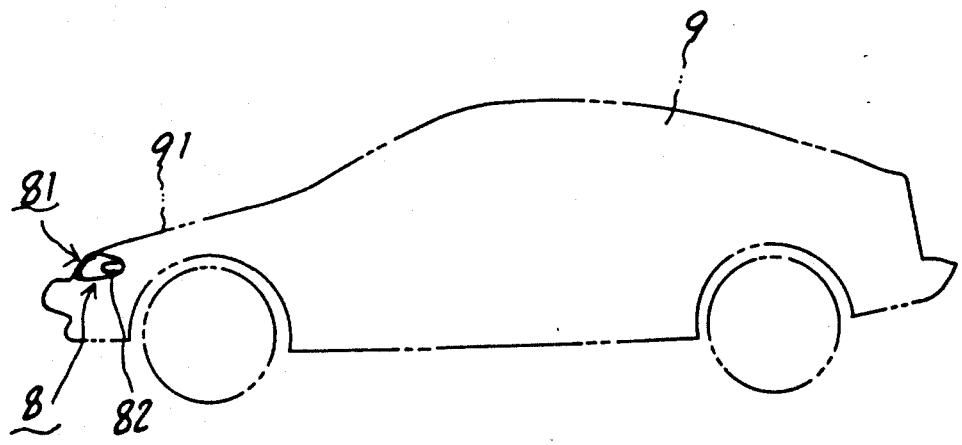

HEAD LAMP DEVICE FOR AUTOMOBILES

BACKGROUND OF THE INVENTION

1. Field of the invention

This invention relates to a head lamp device for the use in automobiles, and particularly to an improvement of a head lamp cover thereof.

2. Brief Description of the Prior Art

Heretofore, two types of head lamp devices for automobiles are known. One is of the type called "stationary type device", and the other is of the type called "retractable device". The stationary type device is always exposed from the bonnet. The retractable device is retracted and hidden in a bonnet when it is not in operation and brought out when it is to be actuated.

However, the conventional stationary type head lamp device had the shortcomings that since a front cover lens is always exposed to the surface of the bonnet, design of the bonnet is restricted.

On the other hand, the conventional retractable type head lamp device had the advantages that when the head lamp is not in operation, the surface of the bonnet looks smooth and fancy because the head lamp is hidden in the bonnet. However, this conventional device also had the shortcomings that when the head lamp is to be actuated, the head lamp is required to be brought out from the inner side of the bonnet so as to be projected from the bonnet and therefore, the vehicle gives a different impression (i.e., the appearance of the vehicle is dedegraded). In addition, when the vehicle is running, the wind hits the head lamp to generate a vortex (i.e., mass of whirling wind) with the results that air resistance to the vehicle is increased.

SUMMARY OF THE INVENTION

It is therefore an object of the present invention to provide, in order to obviate the above shortcomings, a head lamp device for automobiles, in which the surface of the bonnet is always maintained smooth whether the head lamp is actuated or not, and the air stream of the wind is not disturbed when a vehicle is running.

The above object has been achieved by providing a head lamp device for automobiles comprising a light source 82 and a cover member 81 arranged in front of the light source, said light source 82 comprising a transparent hard resin plate 1 curved outwardly at a central part thereof, and a transparent soft resin sheet 2 being intimately in contact with a rear surface of said transparent hard resin plate 1 with a peripheral edge 21 of said transparent soft resin sheet 2 attached fluid tight to a peripheral edge of said transparent hard resin plate 1, said transparent hard resin plate 1 being provided with a pipe 3 served as a port through which a colored solution 4 is supplied into and removed from a space formed between said transparent hard resin plate 1 and said transparent soft resin sheet 2.

The transparent hard resin plate 1 and transparent soft resin sheet 2 may be colorless transparent.

The colored solution 4 may be an anti-freezing solution.

The port pipe 3 may be disposed to a lower part of the transparent hard resin plate 1.

By virtue of the above-mentioned constitution of a head lamp device for automobiles according to the present invention, when the head lamp is not in operation, the colored solution 4 is supplied into the space between the transparent hard resin plate 1 and the transparent soft resin sheet 2 through the port pipe 3. By this, the transparent soft resin sheet 2 is swollen, and a colored solution layer 4 is formed between the transparent hard resin plate 1 and the transparent soft resin sheet 2. As a result, the cover member 81 is given coloring by the colored solution 4. Then, the vehicle gives an impression to those who look the vehicle that no head lamp device 8 is mounted on it.

On the other hand, when the head lamp is to be actuated, the colored solution 4 is removed from the space between the transparent hard resin plate 1 and the transparent soft resin sheet 2 through the port pipe 3 by means of actuation of a pump. By this, the transparent soft resin sheet 2 is caused to be intimately contacted with the transparent hard resin plate 1 so as to be integral therewith. In the foregoing state, rays of light coming from the light source 82 is allowed to penetrate the cover member 81 to illuminate the front of the cover member 81.

Accordingly, by the use of this head lamp device 8 for automobiles, the surface of the bonnet 91 of a vehicle 9 can be maintained smooth whether the head lamp is in operation or not. Moreover, the vehicle 9 equipped with this device can run smoothly and stably because the air stream of the wind is not disturbed when the vehicle is running.

If the transparent hard resin plate 1 and transparent soft resin sheet 2 are designed to be colorless transparent, the same coloring as that of the vehicle body 9 can be easily given to the head cover member 81 when the head lamp is not in operation.

The above and other objects and the features and advantages of the present invention will be more clearly understood from the following description taken in conjunction with the accompanying drawings.

BRIEF DESCRIPTION OF THE DRAWINGS

FIG. 4 is an enlarged sectional view taken on line IV—IV of FIG. 1;

FIG. 5 is likewise an enlarged sectional view taken on line V—V of FIG. 3; and

FIG. 6 is a schematic view of the device mounted on a vehicle.

DETAILED DESCRIPTION OF THE EMBODIMENT

Figure 1:
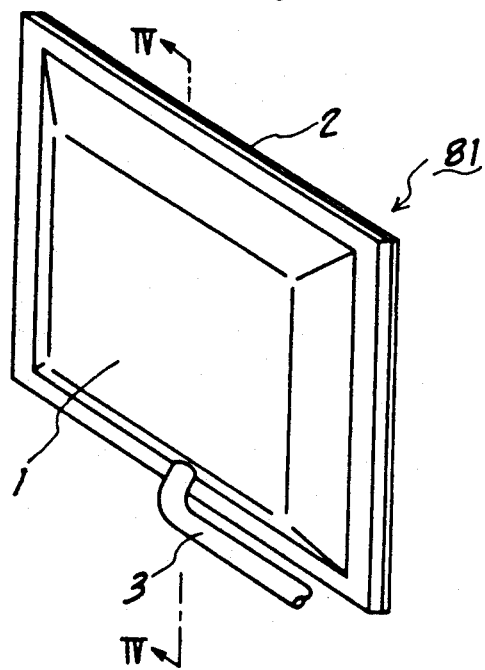
FIG. 1 is a perspective view of a head lamp device for automobiles according to one embodiment of the present invention.

One preferred embodiment of the present invention will now be described with reference to the accompanying drawings.

Referring first to FIG. 6, the numeral 9 denotes a vehicle, and 91, a bonnet thereof. A head lamp device generally designated by the numeral 8 is embedded in a front part of the bonnet 91. A cover member 81 of the head lamp device 8 is flush with the surface of the bonnet 91. The numeral 82 denotes a light source for the head lamp device 8.

Next, the cover member 81 will be described in detail with reference to FIGS. 1 through 5 inclusive.

Figure 2:
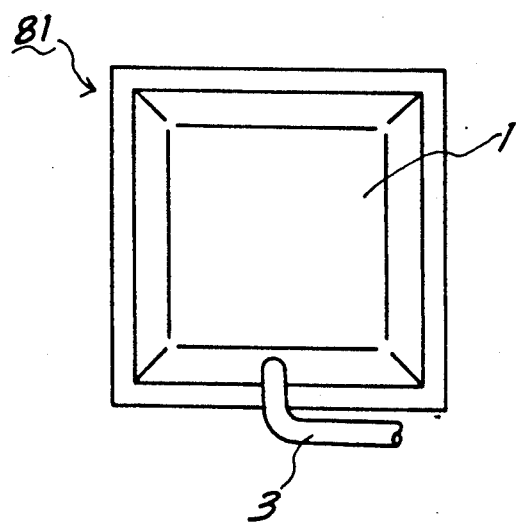
FIG. 2 is a front view thereof.
Figure 3:
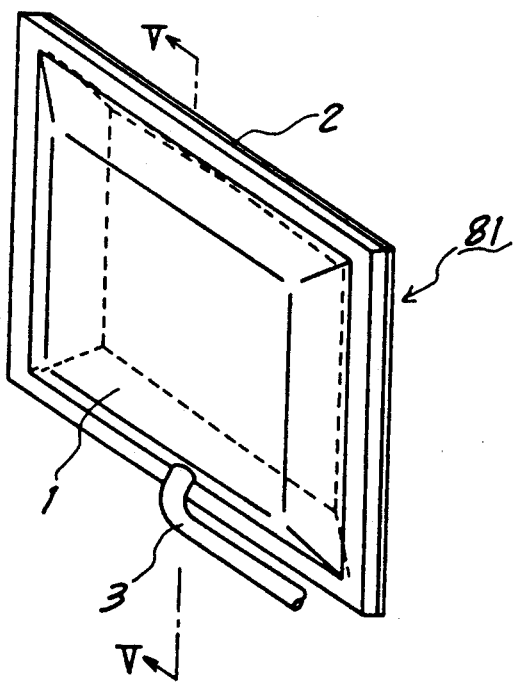
FIG. 3 is a perspective view of the device of FIG. 1, but with a colored solution filled therein.

In FIGS. 1 through 3, the numeral 1 denotes a colorless transparent hard resin plate which constitutes the cover member 81. The hard resin plate 1 is curved outwardly at a central portion thereof. The numeral 2 denotes a colorless transparent soft resin sheet which also constitutes the cover member 81. The soft resin sheet 2 is in intimate contact with the hard resin plate 1 with a peripheral edge 21 of the former attached fluid tight to the latter. By virtue of the foregoing arrangement, the soft resin sheet 2 can be reciprocally moved in directions as shown by a two-headed arrow of FIG. 4 with respect to the hard resin plate 1, and a state of FIG. 4 and a state of FIG. 5 can be selectively provided. The numeral 3 denotes a pipe (which is sometimes referred to as a port pipe), which is mounted to the hard resin plate 1. This pipe 3 is adapted to supply therethrough a colored anti-freezing solution (including glycol) into a space between the hard resin plate 1 and the soft resin sheet 2 and to remove therethrough the solution from the space.

When a colored anti-freezing solution is supplied into the space between the hard resin plate 1 and the soft resin sheet 2 from a solution tank through the pipe 3 by means of actuation of a motor (not shown), the soft resin sheet 2 is expanded rightward by fluid pressure, to thereby form a colored solution layer 4 between the hard resin plate 1 and the colorless transparent soft resin sheet 2 (see FIG. 5). Then, the cover member 81 is colored by the colored solution 4. As a result, existence of the cover member 81 and therefore, the head lamp device 8 becomes difficult to be recognized.

On the other hand, when the colored anti-freezing solution 4 is removed from the colored solution layer 4 between the hard resin plate 1 and the colorless transparent soft resin sheet 2 through the pipe 3 by means of actuation of a motor (not shown), the soft resin sheet 2 is intimately contacted with the colorless transparent resin plate 1 so as to be integral therewith (see FIG. 4). Then, rays of light coming from the light source 82 is allowed to transmit the cover member 81 to illuminate the front of the cover member 81.

In this embodiment, the motor pump is operatively connected to a switch of the head lamp.

Although one preferred embodiment has been described, the present invention should by no means be limited to this embodiment. It goes without saying that various changes and modifications can be made by those skilled in the art without departing from the scope of the appended claim.

What is claimed is:

1. A head lamp device for automobiles comprising a light source and a cover member arranged in front of the light source, said light source comprising a transparent hard resin plate curved outwardly at a central part thereof, and a transparent soft resin sheet being intimately in contact with a rear surface of said transparent hard resin plate with a peripheral edge of said transparent soft resin sheet attached fluid tight to a peripheral edge of said transparent hard resin plate said transparent hard resin plate being provided with a pipe served as a port through which a colored solution is supplied into and removed from a space formed between said transparent hard resin plate and said transparent soft resin sheet.

2. A head lamp device for automobiles as claimed in claim 1, wherein said transparent hard resin plate and transparent soft resin sheet are colorless transparent.

3. A head lamp device for automobiles as claimed in claim 1, wherein said colored solution is an anti-freezing solution.

4. A head lamp device for automobiles as claimed in claim 1, wherein said port pipe is disposed to a lower part of said transparent hard resin plate.

* * * * *